US010970612B2

(12) United States Patent
Scruggs et al.

(10) Patent No.: US 10,970,612 B2
(45) Date of Patent: Apr. 6, 2021

(54) INTERACTIVE CORE FOR ELECTRONIC CARDS

(71) Applicant: Fiteq, Inc., Lakeland, FL (US)

(72) Inventors: Michael Scruggs, Lakeland, FL (US); Uwe Trueggelmann, British Columbia (CA)

(73) Assignee: FITEQ, INC., Lakeland, FL (US)

( * ) Notice: Subject to any disclaimer, the term of this patent is extended or adjusted under 35 U.S.C. 154(b) by 0 days.

(21) Appl. No.: 16/166,557

(22) Filed: Oct. 22, 2018

(65) Prior Publication Data

US 2020/0125911 A1    Apr. 23, 2020

(51) Int. Cl.
| | | |
|---|---|---|
| *G06K 19/077* | (2006.01) | |
| *H05K 1/18* | (2006.01) | |
| *H05K 3/28* | (2006.01) | |
| *G06K 19/07* | (2006.01) | |
| *G06Q 20/34* | (2012.01) | |

(52) U.S. Cl.
CPC ... *G06K 19/07722* (2013.01); *G06K 19/0703* (2013.01); *G06K 19/07747* (2013.01); *G06K 19/07775* (2013.01); *G06Q 20/341* (2013.01); *H05K 1/187* (2013.01); *H05K 3/284* (2013.01)

(58) Field of Classification Search
CPC ....... G06K 19/07722; G06K 19/07775; G06K 19/0703; G06K 19/07747; H05K 3/284; H05K 1/187; G06Q 20/341
See application file for complete search history.

(56) References Cited

U.S. PATENT DOCUMENTS

| | | | |
|---|---|---|---|
| 6,486,693 B1 * | 11/2002 | Conner | G01R 31/31924 |
| | | | 324/756.05 |
| 7,959,085 B2 | 6/2011 | Singleton | |
| 8,540,165 B2 | 9/2013 | Foo et al. | |
| 8,657,983 B2 | 2/2014 | Singleton | |
| 8,727,224 B2 | 5/2014 | Singleton | |
| 2012/0267437 A1 * | 10/2012 | Jain | G06Q 20/3574 |
| | | | 235/492 |
| 2015/0048928 A1 * | 2/2015 | Cox | G06K 19/0712 |
| | | | 340/5.65 |
| 2016/0203399 A1 * | 7/2016 | Cox | B32B 7/04 |
| | | | 156/275.5 |
| 2019/0139881 A1 * | 5/2019 | Bosquet | H01L 23/49838 |

\* cited by examiner

*Primary Examiner* — Sonji N Johnson
(74) *Attorney, Agent, or Firm* — Roy L Anderson

(57) ABSTRACT

An interactive core for use in making electronic cards has rear and front adhesive layers which surround a stiffening spacer which has an interior opening in which electronic components (e.g., a PCB, battery and display) are located along with thermosetting polymeric material. A battery contained within the interior opening can be activated from an off state to an on state via use of an initialization antenna which can also be configured to allow a CPU to be customized for personal use.

19 Claims, 3 Drawing Sheets

SECTION A-A
SCALE 1 : 1

DETAIL A
SCALE 32 : 1

DETAIL B
SCALE 8 : 1

# INTERACTIVE CORE FOR ELECTRONIC CARDS

FIELD OF THE INVENTION

The present application is in the field of manufacturing cards the size of a credit card and, more particularly, to the manufacture of cards with EMV chips and electronic components.

BACKGROUND OF THE INVENTION

Credit and payment cards manufactured today often include EMV chips and there is a need to be able to efficiently manufacture such cards and electronic cards with a power source, an EMV chip (or not) and other electronics that still comply with strict quality control standards required by card issuing organizations.

It is known to make pre-lamination cores capable of being manufactured into electronic cards through use of conventional card making equipment in which printed overlays and laminate can be applied to the pre-lamination core as is described in U.S. Pat. Nos. 7,959,085, 8,657,983 and 8,727,224, the disclosures of which are specifically incorporated herein by reference.

The instant invention seeks to advance the art of pre-lamination cores.

SUMMARY OF THE INVENTION

In accordance with the present invention, an electric core has rear and front adhesive layers with an interactive core configured between them. The interactive core has a stiffening spacer (which may include an antenna inlay) with an interior opening surrounded by an outer edge border and a PCB is configured within the interior opening while a thermosetting polymeric material is configured within the interior opening between the rear and front adhesive layers. A CPU can be electronically connected to the PCB and a battery within the interior opening. The CPU can be customized for personal use by an initialization antenna (which may be an ISO 14443 antenna) which can also be used to cause the battery to go from an off state to an activated state and, once activated, the battery will remain active. Once the CPU has been customized for personal use, the CPU can be prevented from altering the customization.

This and further objects and advantages of the present invention will be apparent to those skilled in the art in connection with the drawing and the detailed description of the invention set forth below.

BRIEF DESCRIPTION OF THE DRAWINGS

FIG. 1B is a non-exploded top plan view of the electronic core of FIG. 1A while

DETAILED DESCRIPTION OF THE INVENTION

Figure 1A:
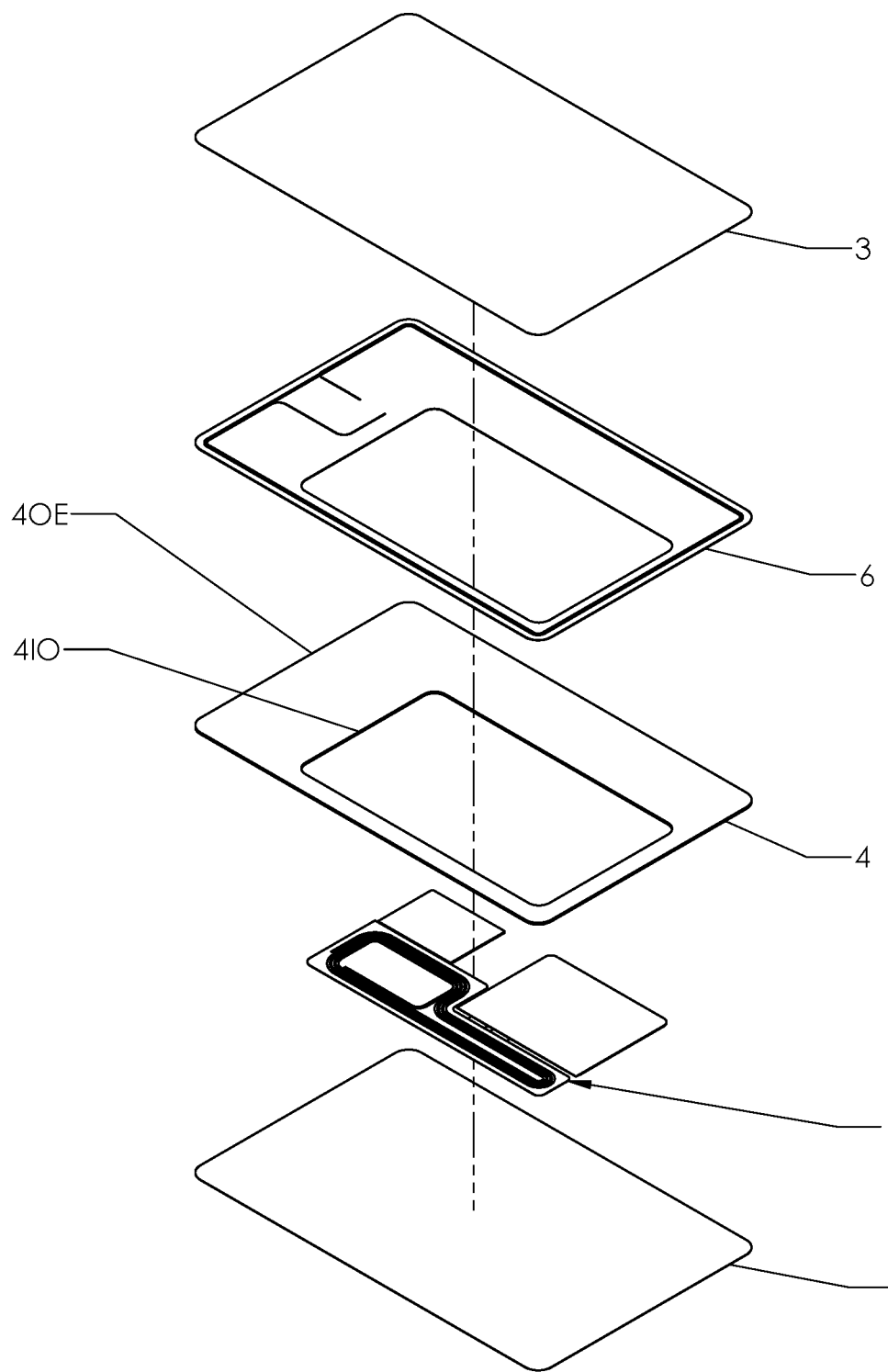
FIG. 1A is an exploded view which illustrates an electronic core in accordance with the present invention.
Figure 1B:
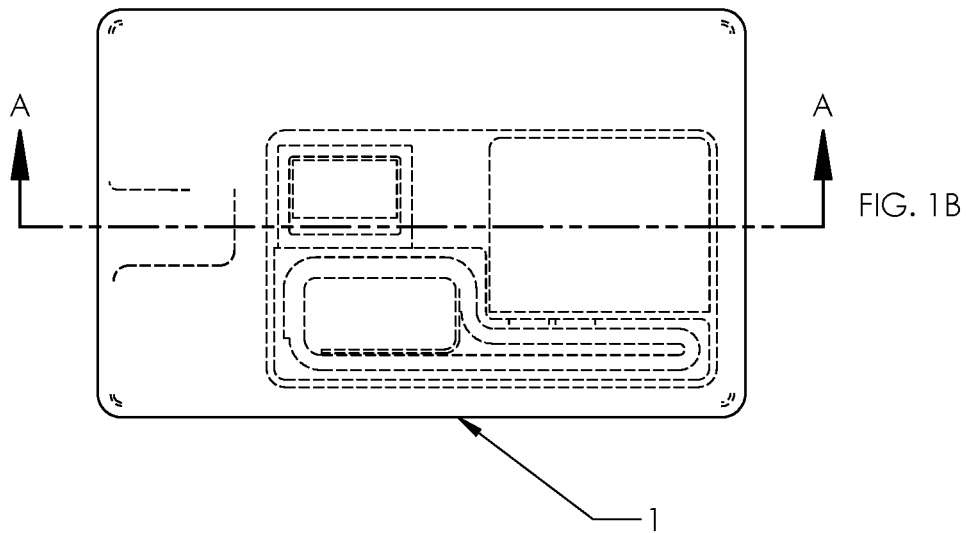
Figure 1C:
FIG. 1C is a cross section view of FIG. 1B.
Figure 1D:
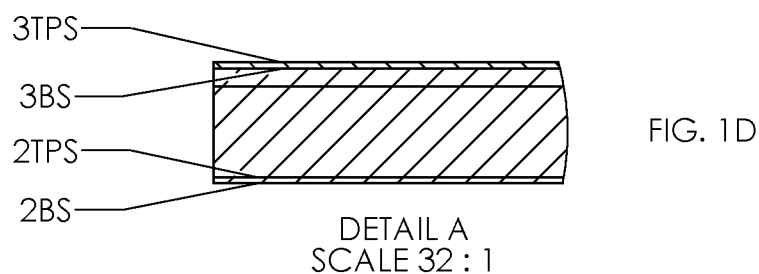
FIGS. 1D and 1E are enlarged partial cross section views showing detail of A in FIG. 1C, FIG. 1D having a scale of 32:1, FIG. 1E having a scale of 8:1.
Figure 1E:
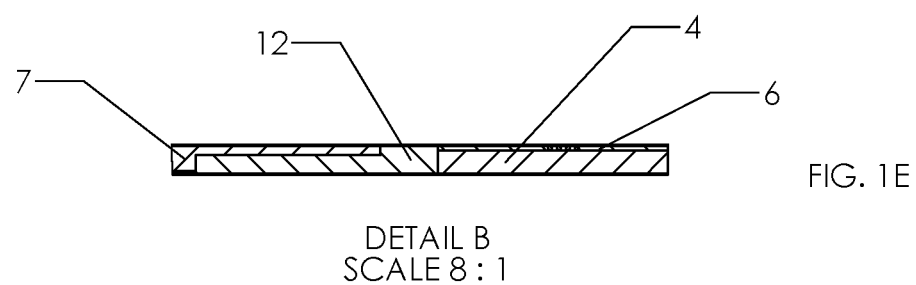
Figure 1F:
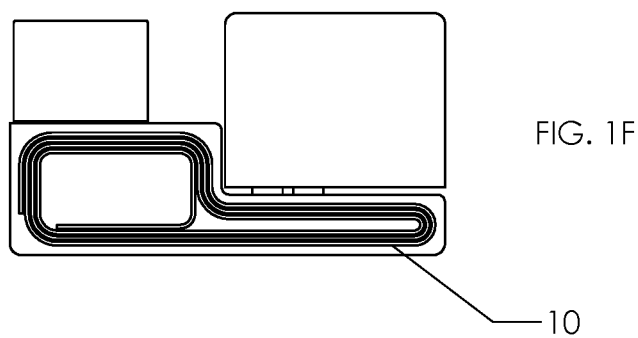
FIGS. 1F and 1G illustrate bottom and top plan views of an interactive core which can be used in the electronic core illustrated in FIG. 1A.
Figure 1G:
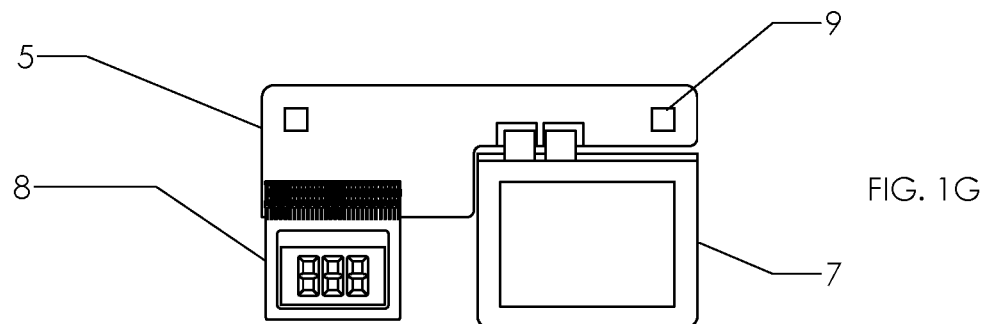

In connection with the present invention, the term "interactive core" shall be used to define a thin inlay that can be supplied to manufacturers for finishing cards using traditional manufacturing methods. The interactive core contains components such as batteries, processors, displays, biometric sensors and other devices necessary to construct an ISO ID-1 compliant card with interactive features. Devices manufactured using the interactive core inlay can be used as cards, tags or other devices used for financial transactions, transportation access, secure access and other applications.

In accordance with the present invention, the interactive core concept leverages the benefits of a reactive injection molding process for embedding sensitive electronic components in a card form factor while leveraging the finishing, personalization and distribution capacity that exists among traditional card manufacturers.

The invention described herein requires that the interactive core be finished with equipment already in place or readily available to the card manufacturing industry. Accordingly, to better understand the present invention, traditional card manufacturing techniques are described here so the special features of interactive core can be more easily understood.

Cards, in a simple form, consist of three layers: 1) a core of rigid PVC, typically white, upon which images are printed using offset or digital printing techniques; 2) a clear PVC rear overlay typically with magnetic stripe material pre-laminated in place; and 3) a clear PVC front overlay. The three layers are laminated together as sheets of a size large enough to make an array of cards in 3×5, 3×7 and other formats.

Post lamination individual cards are separated from the sheets using precision die punch equipment and collected into magazines.

Holograms and signature panels are then hot stamped onto the surface of the card using hot stamp equipment fed by magazines previously filled by the punching equipment. Cards having holograms and signature panels applied are returned to magazines for subsequent personalization processing.

Cards are personalized by applying personal information such as name, account number, expiry date and security code to the magnetic stripe and the surface of the card. Magnetic media is encoded using an encoding module. Numerous methods exist for applying personal data to the surface of the card:

Most commonly name, account number and expiry date are applied by an embossing process performed by a module common to all personalization equipment manufacturers. The security code is applied by a similar indent marking module.

Laser marking is an alternate method for surface personalization.

UV curing inks are also used for surface personalization. After personalization, cards are packaged with documents and other fulfillment materials for mailing to the customer. Printers, card adhesive stations, folders and envelop stations are common fulfillment modules on card personalization equipment.

Transactions via payment module, or chip, require additional manufacturing process steps. The payment module which includes a contact plate for interfacing payment terminals and an attached microcontroller known as a payment controller is installed after punching and before personalization. The payment module is installed by machines that mill a pocket in the card into which the payment module is placed and usually affixed using a hot melt adhesive.

Contactless transactions require further manufacturing steps. The three-layer construction is modified to include at least an additional core layer which has antenna wire embedded in it or alternately applied by some form of deposition. The antenna wire is then connected to terminals on the payment module. During payment module installation additional features are milled to access the antenna wire ends which are then connected to the terminals on the payment module using conductive adhesive. There is an alternate method using a coil on the backside of the payment module called coil on module.

This description will now focus on traditional card manufacturing techniques and the special features incorporated into the interactive core of the present invention to facilitate finishing and personalization using common card finishing and personalization equipment.

The interactive core of the present invention will require specialized features to allow the use of existing equipment for the finishing and personalization of cards.

Printing. Leveraging current card manufacturers' capability to offset print onto PVC is critical to the success of interactive core. Typically, the offset presses used by card manufacturers are sheet fed units which have issues handling sheets (under 125 μm). To create a card meeting ISO thickness standards the total thickness of the interactive core will be less than 0.5 mm.

Lamination. The interactive core inlay must be compatible with existing equipment used to laminate printed sheets to the core. The temperatures, however, need to be lower to protect the electronic components embedded within the core. Therefore, the outer layers of the interactive core will be a thin (25 μm) thermally activated adhesive that will be compatible with traditional PVC overlays and meet the industry requirements for peel strength and thermal resistance.

Card Separation. Within the two outer adhesive layers will be a PVC (or other typical card material) frame. The frame will have a cavity away from the edges that will house the electronics and will be filled with polyurethane using RIM (see U.S. Pat. No. 8,657,983). The frame material in combination with the overlay materials is meant to create a card perimeter that presents materials for which existing, standard die punch machines are designed to process.

Payment Module Installation. In one embodiment the area of the card defined for contact locations will be part of the PVC frame. Again, the logic is to present material in the area of the payment module for which existing milling equipment, cutters and adhesives are designed to process. Other embodiments could include embedding the payment module in an area within the frame that has been filled with polyurethane via the RIM process. Testing will have to be performed to determine the compatibility with existing processing methods.

Antenna for Contactless Transactions. The PVC frame will be modified for cards designed for contactless transactions. During interactive core construction the frame will be made thinner and a commercially available antenna inlay will be laminated to the frame. Alternately, the antenna could also be embedded directly into the frame.

Antenna for Activation and Personalization. The printed circuit board assembly will include a separate antenna designed to function per the ISO/IEC 14443 specification, the contents of which is specifically incorporated herein by reference in its entirety, that will be used specifically for activating and personalizing the card. The antenna on the card is not used for transactions and in this embodiment is not electrically connected to the payment module or payment antenna. The personalization antenna can be used for at least three purposes.

Circuit Activation. It is desirable to have the battery disconnected from any load while sheets of interactive cores are being stored by a manufacturer of interactive cores or customers for interactive cores. A circuit can be designed that allows the battery to be disconnected from the battery until a unique RF signal is received to permanently and irreversibly connect the battery to the card control circuit; one example of such a circuit is a latching circuit.

Personalization. Elements on the card that require personalization can be personalized after circuit activation. In one embodiment the card will contain a display for presenting a dynamic security code. In this embodiment an IC referred to as a card controller will be attached to the to the personalization antenna. Data such as algorithm seed data can be transmitted to the card controller during the personalization process.

Post Personalization. A final code can be sent to the card controller via the personalization antenna as the final step in the personalization process to program the card controller to ignore any signals detected by the personalization antenna.

Simplified card personalization steps follow. Note some of the steps may be performed in different orders.
1. Personalize the payment controller.
2. Read the payment controller and seed/program the card controller with the appropriate Dcvx data or other data as the card design requires.
3. Read the payment controller and encode the magnetic stripe with the appropriate data.
4. Read the payment controller and perform surface personalization with the appropriate data.

The invention will now be described in even greater detail by reference to an especially preferred embodiment illustrated in FIGS. 1A-1. In the Figures and the following description, number designations indicate various features of the invention, with like number designations referring to like features throughout both the drawings and the description. Although the Figures are described in greater detail below, the following is a glossary of the elements identified in the Figures.

1 electronic core
2 rear adhesive layer
2TPS top planar surface of rear adhesive layer
2BS bottom planar surface of rear adhesive layer
3 front adhesive layer
3TPS top planar surface of front adhesive layer
3BS bottom planar surface of front adhesive layer
4 stiffening spacer
4IO interior opening of stiffening spacer
4OE outer edge of stiffening spacer
5 printed circuit board (PCB)
6 antenna inlay
7 battery
8 screen
9 central processing unit (CPU)
10 initialization antenna
11 interactive core
12 polyurethane Electronic core 1 has front and rear adhesive layers 3, 2, each of which has a top planar surface TPS and a bottom planar surface BS. Located in between front and rear adhesive layers 3, 2 is stiffening spacer 4 which has interior opening 4IO and outer edge 4OE. An antenna inlay can also be included with stiffening spacer 4. Interior opening 4IO holds interactive core 11.

Interactive core 11, in an especially preferred embodiment, has battery 7 and screen 8 electrically connected to PCB 5 and CPU 9 is mounted to PCB 5. Initialization antenna 10 is either mounted or formed in PCB 5. The portion of interior opening 4IO that does not contain electronic components is filled with polyurethane 12.

While the present invention has been described herein with reference to certain preferred embodiments, these embodiments have been presented by way of example only, and not to limit the scope of the invention. Additional embodiments thereof will be obvious to those skilled in the art having the benefit of this disclosure. Further modifications are also possible in alternative embodiments without departing from the inventive concepts disclosed herein.

Accordingly, it will be readily apparent to those skilled in the art that still further changes and modifications in the actual concepts described herein can readily be made without departing from the spirit and scope of the disclosed inventions.

What is claimed is:

1. An electronic core for an electronic card, comprising:
   a rear adhesive layer configured to form a rear top planar surface and a rear bottom planar surface;
   a front adhesive layer configured to form a front top planar surface and a front bottom planar surface; and
   an interactive core configured within the rear top planar surface and the front bottom planar surface, wherein said interactive core is comprised of:
   a stiffening spacer configured with an interior opening surrounded by an outer edge border located between the rear top planar surface and the front bottom planar surface;
   a printed circuit board ("PCB") configured within the interior opening;
   an initialization antenna which is configured for activating and personalizing the electronic core and is not configured for use with payment transactions; and
   a thermosetting polymeric material configured within the interior opening between the rear top planar surface and the front bottom planar surface;
   wherein the electronic core is configured so that it has an outer surface shape defined by the rear bottom planar surface, the front top planar surface and the outer edge border.

2. The electronic core of claim 1, wherein the stiffening spacer is comprised of a non-interactive spacer and an antenna inlay.

3. The electronic core of claim 1, wherein the initialization antenna is configured within the PCB.

4. The electronic core of claim 1, further comprising a central processing unit ("CPU") electronically connected to the PCB which is powered by a power source configured within the interior opening.

5. The electronic core of claim 4 wherein the power source is comprised of a battery electronically connected to the PCB.

6. The electronic core of claim 5 further comprising means for customizing the CPU for personal use.

7. The electronic core of claim 5 wherein the initialization antenna is configured to allow the CPU to be customized for personal use when the electronic core is activated and personalized.

8. The electronic core of claim 7 wherein the initialization antenna is comprised of an ISO 14443 antenna.

9. The electronic core of claim 7 further comprising means for causing the battery to go from an off state to an activated state when the electronic core is activated and personalized through use of the initialization antenna.

10. The electronic core of claim 7 further comprising electronics for causing the battery to activate from an off state to an activated state when the electronic core is activated and personalized through use of the initialization antenna.

11. The electronic core of claim 10 wherein the battery remains in the activated state once it has been activated.

12. The electronic core of claim 10 wherein said electronics for causing the battery to activate is comprised of a latching circuit.

13. The electronic core of claim 10 wherein the outer surface shape has a maximum thickness of less than 500 μm between the rear bottom planar surface and the front top planar surface.

14. The electronic core of claim 7 further comprising means for preventing the initialization antenna from being used to alter the CPU once the CPU has been customized for personal use.

15. A process, comprising the steps of:
   (1) manufacturing an electronic core having a rear adhesive layer configured to form a rear top planar surface and a rear bottom planar surface, a front adhesive layer configured to form a front top planar surface and a front bottom planar surface, and an interactive core configured within the rear top planar surface and the front bottom planar surface, wherein said interactive core is comprised of a stiffening spacer configured with an interior opening surrounded by an outer edge border located between the rear top planar surface and the front bottom planar surface, a printed circuit board ("PCB") configured within the interior opening, and a thermosetting polymeric material configured within the interior opening between the rear top planar surface and the front bottom planar surface, wherein the electronic core is configured so that it has an outer surface shape defined by the rear bottom planar surface, the front top planar surface and the outer edge border;
   (2) causing a power source within the electronic core to go from an off state to an activated state;
   (3) customizing the electronic core for personal use as an electronic card; and
   (4) causing the electronic core to ignore any further customization of the electronic core.

16. The process of claim 15 wherein the power source is activated through use of an initialization antenna configured within the interior opening when the electronic core is activated and personalized.

17. The process of claim 16, wherein the power source is comprised of a battery.

18. The process of claim 15, wherein the power source is comprised of a battery.

19. A process, comprising the steps of:
   (1) manufacturing an electronic core having a rear adhesive layer configured to form a rear top planar surface and a rear bottom planar surface, a front adhesive layer configured to form a front top planar surface and a front bottom planar surface, and an interactive core configured within the rear top planar surface and the front bottom planar surface, wherein said interactive core is comprised of a stiffening spacer configured with an interior opening surrounded by an outer edge border located between the rear top planar surface and the front bottom planar surface, a printed circuit board ("PCB") configured within the interior opening, and a thermosetting polymeric material configured within the interior opening between the rear top planar surface and the front bottom planar surface, wherein the electronic core is configured so that it has an outer surface shape defined by the rear bottom planar surface, the front top planar surface and the outer edge border;

(2) customizing the electronic core for personal use as an electronic card through use of an initialization antenna configured within the interior opening; and (3) causing the electronic core to ignore any further customization of the electronic core.

* * * * *